US005699415A

United States Patent [19]

Wagner

[11] Patent Number: 5,699,415

[45] Date of Patent: Dec. 16, 1997

[54] METHOD FOR MATCHING THE DATABASE BETWEEN AN ELECTRONIC POSTAGE METER MACHINE AND A DATA CENTER

[75] Inventor: Andreas Wagner, Berlin, Germany

[73] Assignee: Francotyp-Postalia AG & Co., Birkenwerder, Germany

[21] Appl. No.: 492,779

[22] Filed: Jun. 21, 1995

[30] Foreign Application Priority Data

Jun. 24, 1994 [DE] Germany .......................... 44 22 263.7

[51] Int. Cl.[6] .................................................. H04M 11/00

[52] U.S. Cl. ...................... 379/106; 379/102; 364/464.02

[58] Field of Search .................................. 379/102, 104, 379/106, 107; 364/464.02

[56] References Cited

U.S. PATENT DOCUMENTS

| | | | |
|---|---|---|---|
| 3,769,445 | 10/1973 | McFiggins et al. . | |
| 4,097,923 | 6/1978 | Eckert, Jr. et al. . | |
| 4,787,045 | 11/1988 | Storace et al. | 379/102 |
| 5,157,616 | 10/1992 | Haug | 364/464.02 |
| 5,224,046 | 6/1993 | Kim et al. | 364/464.02 |
| 5,237,506 | 8/1993 | Horbal et al. | 364/464.02 |
| 5,369,401 | 11/1994 | Haines | 364/464.02 |

*Primary Examiner*—Stella Woo

*Attorney, Agent, or Firm*—Hill, Steadman & Simpson

[57] ABSTRACT

In a method for matching the data base in an electronic postage meter to the database in a data center with which the postage meter is in communication, a transaction for adding credit to the postage meter machine takes place in two transaction procedures. In a first transaction procedure, code words are exchanged between the postage meter machine and the data center, and upon mutual verification of the code words at the data center and at the postage meter machine, a requested amount of credit is stored in a selected value memory in the postage meter machine and the same amount is stored in a selected value memory at the data center. In a second transaction procedure, code words are again exchanged between the data center and the postage meter machine and upon verification of these further code words, the selected value stored at the selected value memory at the data center is used to debit the debit memory at the data center, and this same value, stored in the selected value memory at the postage meter machine, is used to credit the credit memory at the postage meter machine. A method for ensuring the integrity of data predominantly stored in two data sets is also disclosed.

26 Claims, 7 Drawing Sheets

METHOD FOR MATCHING THE DATABASE BETWEEN AN ELECTRONIC POSTAGE METER MACHINE AND A DATA CENTER

BACKGROUND OF THE INVENTION

1. Field of the Invention

The present invention is directed to a method for matching the database in the data processing stage of an electronic postage meter machine containing a credit memory for a postage credit and the debiting unit of a data center having a debiting memory for the postage meter machine and is also directed to a postage meter machine suitable for the implementation of the aforementioned method.

2. Description of the Prior Art

Heretofore, postage meter machines had to be brought to a Post Office after the postage credit stored in the postage meter machine was used, where a postal official would refill the credit memory upon payment of the appropriate fees. In order to avoid the user of the postage meter machine having to make this trip to a Post Office, it is well-known to reload the credit in the postage meter machine via what is referred to as a remote value setting on the basis of a data exchange between a user station at which the postage meter machine is present and a data center. It must thereby be assured that the amount loaded in the postage meter machine is also known in the data center, so that the user of the postage meter machine can be billed. One must also reliably prevent the user from entering the postage credit into the postage meter machine unknown to the data center and to prevent that the reload amount entered into the postage meter machine differs from the amount communicated to the data center.

U.S. Pat. No. 3,792,446 discloses a remote value setting method wherein the data exchange between the user station and the data center includes the communication of a cryptonumber from the data center to the user station. The user can unlock a lock at the postage meter machine with this cryptonumber for a one-time reloading event having a rigidly prescribed reloading amount. Since the reloading amount or scheduled amount is rigidly prescribed and cannot be modified, it suffices to acquire the number of reloading events in the data center for the purpose of a debiting.

For various reasons, it can be advantageous for the user of the postage meter machine to determine individually the amount of the reloaded amount on a case-by-case basis, at least with certain limits. To this end, German OS 28 20 658 discloses a remote value setting procedure having a variable reloading amount. The agreement of the reloaded amount added to the remaining credit in the postage meter machine with the reloaded amount debited in the data center is assured by causing the freely selectable reloaded amount to enter into the calculation of combination characteristic values sequencing independently of one another in the postage meter machine and in the data center. A verification of the combination characteristic value that is communicated from the data center to the postage meter machine and that contains the variable credit value in the postage meter machine is only possible when both the postage meter machine and the data center have calculated with the same reload amount. This reload amount is automatically added to the remaining credit in the credit memory of the postage meter machine in the postage meter machine given a successful verification of the communication combination value without further intervention into the reloading procedure being possible on the part of the user.

SUMMARY OF THE INVENTION

It is an object of the present invention to provide a method for matching the database in the data processing stage of an electronic postage meter machine with that of the debiting unit of a data center with which the postage meter machine is in communication which ensues in a manner which is user-friendly, but still reliable with respect to accuracy and security, and to provide a postage meter machine operable in accordance with such a method.

This object is inventively achieved in a method wherein a change of value mode is set at the postage meter machine, a fixed value entered into the postage meter machine is communicated to the data center in a first transaction between the postage meter machine and the data center which includes the exchange of code numbers and this selected value is stored in a selected value memory of the postage meter machine and in a selected value memory at the data center. A reload mode is then set, and the selected value stored in the respective selected value memory is added to the value stored in the credit memory of the postage meter machine and to the value stored in the debiting memory of the data center in a second transaction that includes the exchange of code numbers between the postage meter machine and the data center.

The division in the inventive method for matching the debiting data in the postage meter machine and in the data center into two self-contained transactions has a number of advantages. First, the first transaction can be omitted when the selected value is not to be modified. In this case, the postage credit is refilled with the value stored in the selected value memory. This yields a simplified method for that case wherein the user does not wish to modify the selected value at all. When, however, the user wishes to change the selected value, this value can be modified separately from the reloading event. This offers the possibility of first terminating and checking the modification of the selected value. This enhances the certainty that the postage credit is also in fact entered with the desired reload amount. Second, there is the possibility of constructing a user hierarchy for the modification of the selected value and for the reloading. For example, employees in the mail room of a firm may be allowed to implement the remote value setting method with a specific selected amount but that this selected amount is only allowed to be modified by authorized persons in the firm. This can be assured, for example, by requiring the person authorized to modify the selected value must identify himself or herself with an identification number or a suitable password known only to him or her and that must be entered into the postage meter machine for modifying the selected value. This identification step can precede the actual method for modifying the value for example, by permitting the value modification mode only to be initiated after the identification step. It may, however, be integrated into the method for modifying the value.

The inventive method can ensue in a voice version, wherein the exchange of code numbers takes place by voice via telephone between a person at the user station and an operator at the data center. The method can alternatively be implemented in a modem version, which can be fully automated, wherein the exchange of code numbers takes place by the transmission of encrypted information, containing the code numbers, between the postage meter machine and the data center.

The first transaction can operate such that, for example, an identity number identifying the postage meter machine is entered into the postage meter machine, and a first code number is formed in the postage meter machine during the first transaction using the identity number, the entered selected value and auxiliary information on the basis of a "key," i.e., a cipher. The identity number, the desired selected value and the auxiliary information are communicated together with the first code number to the data center. The first code number is verified in the data center and the desired selected value is stored in the selected value memory of the data center. A second code number is then formed in the data center with a key using the identity number and the auxiliary information and is communicated to the postage meter machine. The second code number is verified in the postage meter machine, whereupon, given a successful verification of the second code number, the desired selected value is stored in the selected value memory of the postage meter machine. The method can be ended after the first transaction and the postage meter machine can be switched into the franking mode. The method can also be continued, however, whereby a third code number is formed with a key in the postage meter machine during the second transaction using the identity number and an auxiliary number, the third code number is verified in the data center, and, given a successful verification, the selected value stored in the selected value memory of the data center is added to the value stored in the debiting memory of the data center. A fourth code number is then formed with a key in the data center using the identity number and the auxiliary information and is communicated to the postage meter machine. The fourth code number is verified in the postage meter machine, whereupon, after a successful verification, the selected value stored in the selected value memory of the postage meter machine is added to the value stored in the credit memory of the postage meter machine. The second transaction thus constitutes the actual reloading procedure that ensues with a selected value permanently stored in the postage meter machine. This second transaction can also be implemented at any time by itself without modifying the selected value.

Security against manipulation is assured by keeping the keys employed secret. Any known encryption method can be employed, for example the DES method. In order to enhance security, it is expedient when a key employed for calculating the code numbers is modified after each terminated transaction. The code number formed in the postage meter machine during each transaction is thereby expediently calculated with the key which exists after the termination of the preceding transaction. The code number formed in the data center is calculated with the same key. The new key is communicated to the postage meter machine as part of the code number communicated from the data center and, after verification of these code numbers, is stored in the postage meter machine for the next transaction. At the same time, the new key is also stored in the data center for the next transaction.

When a code number communicated from the postage meter machine to the data center cannot be verified in the data center, the data center has the possibility of repeating the verification with the key employed before the last change of the key. When the code number can be verified with this key, this is an indication that the preceding transaction was not implemented or was not completely implemented in the postage meter machine. This thus provides the possibility of canceling, repeating or correcting transactions that were not terminated or not completely terminated in the postage meter machine which cause the data bases in the postage meter machine and the data center no longer to be congruent.

The data exchange between the postage meter machine and the data center can ensue via modems (referred to below as modem method) as well as via a telephone communication between the user of the postage meter machine and a service person in the data center (referred to below as voice method).

In any case, the information (register values, postage telephone number or personal identification number, etc.) to be communicated to the data center can be encrypted in the postage meter machine with a first function. A standard encryption method, preferably the data encryption standard (DES), is thereby utilized. After the formation of an encrypted message or cryptomessage with the DES algorithm, a code number is formed in the voice method with a second secret function. The implementation of the secret, first function requires a secret number referred to as the key and a program sequence (encryption code) which can encrypt or decrypt data using the key. The implementation of the second secret function, by contrast, requires no key.

The data exchange in the voice method now ensues with the code numbers in the way set forth above. The formation of the code numbers makes it possible to reduce the number of numerals to be communicated by comparison to the initially formed cryptomessage. This is expedient in order to simplify the communication of the information between the user of the postage meter machine and the service person in the data center.

By contrast thereto, the data exchange in the modem method ensues with the cryptomessages analogous to the above-described procedure. Since the data exchange ensues automatically in the modem method, significantly longer, encrypted messages can be exchanged error-free in comparison to the voice method. The formation of code numbers can therefore be omitted in the modem method.

Nonetheless, the two methods are compatible with respect to the shared data center. This is particularly important if instead of a service person at the data center, at least this procedure at the data center is automated.

The invention is also directed to an electronic postage meter machine for the implementation of the above-described method. Such a postage meter machine includes an electronic data processing stage having a credit memory for storing a postage credit, a selected value memory for storing a selected value by which the postage credit can be modified and, connected to the data processing stage, a printer for printing postage values. The postage meter machine further includes a data display, an input unit for entering postage values to be printed and a unit which sets the machine to a credit reload mode wherein, after entry and verification of a reload cryptonumber, the selected value stored in the selected value memory is added to the postage credit. The postage meter machine further inventively includes a unit for setting the machine to a value modification mode wherein, after entry and verification of a value modification cryptonumber, the selected value in the selected value memory can be replaced by a modified selected value entered into the postage meter machine.

The inventive electronic postage meter machine provides the possibility of handling the modification of the selected value and the reloading event separately from one another with the above-described advantages.

The value modification mode, for example, can be set by entering an identity number identifying the postage meter machine and by actuating a first special function key. A second special function key can be provided for switching the postage meter machine from the value modification mode into the franking mode. A reloading event after termination of the value modification or without value modification, i.e., which immediately follows the setting of the value modification mode without implementation of the first transaction, is preferably initiated by repeated (plural) actuation of the first special key.

Also in the inventive postage meter machine, the possibility of selecting the nature of the communication method between the postage meter machine and the data center can be provided by the actuation of at least one selection key at the postage meter machine after entry of the identity or postage telephone number, i.e., making a selection whether the value modification event and/or reloading event should be implemented in the voice method or in the modem method.

Two alternatives are conceivable for this purpose. According to a first version, a selection or special function key is pressed after the entry of the postage telephone number or identity number in order to proceed into a selection menu that is displayed for the user of the postage meter machine in the display field thereof. By actuating a predetermined actuation element, for example a suitable numerical key, the display changes and shows the selected value which is valid at the time, this then being capable of being confirmed or modified.

According to another version, two selection or special function keys are provided, the voice method or the modem method being capable of being directly selected with their actuation.

The invention is also directed to a method for the protected storage of variable data, particularly the data that can vary during a remote value setting.

A power outage can cause a data set to be stored in faulty fashion in a memory. For operating a data processing system, it is therefore known to provide a second (backup) memory for an identical data set and a status memory for a status identification, the latter indicating whether the data set is to be read out from the first memory or from the second memory when the power returns.

Errors in the status identification can be rendered ineffective by redundantly storing the status identification. The most frequently occurring status identification in a majority check, however, need not always be the correct status identification. It is only most probable that the most frequently occurring status identification is also the correct one. An additional probability check only determines whether the number of occurrences is in a valid numbered range but does not supply an unambiguous conclusion as to whether the status identification is correct. With the above-described method, thus, an error that is most frequently stored and thereby lies in the valid range is not recognized.

A further object of the invention is to enhance the reliability given redundant storage with simple means and to eliminate errors.

For achieving this object, a first data set is defined, using a flag, as a current, invariable data set whose data are available for an interrogation. Given a modification of data, this modification ensues in the non-current, second data set and subsequently, using the pointer, the second data set is defined as the current data set and the data from the current, second data set are copied into the non-current, first data set.

These above-described method steps are implemented upon initialization of the memory, i.e., when the initial data are stored, as well as during ongoing operation. The current data set is always invariable. Its data are also not jeopardized given a power outage since a power outage can usually only lead to errors in ongoing write events. The inventive method operates independently of the detection of a power outage during the write event. An important step of the inventive method is checking and, if necessary, restoring the consistency of the stored data as well as the identity of the data stored in the two data sets, as shall be set forth in yet greater detail below.

DESCRIPTION OF THE PREFERRED EMBODIMENTS

Figure 1:
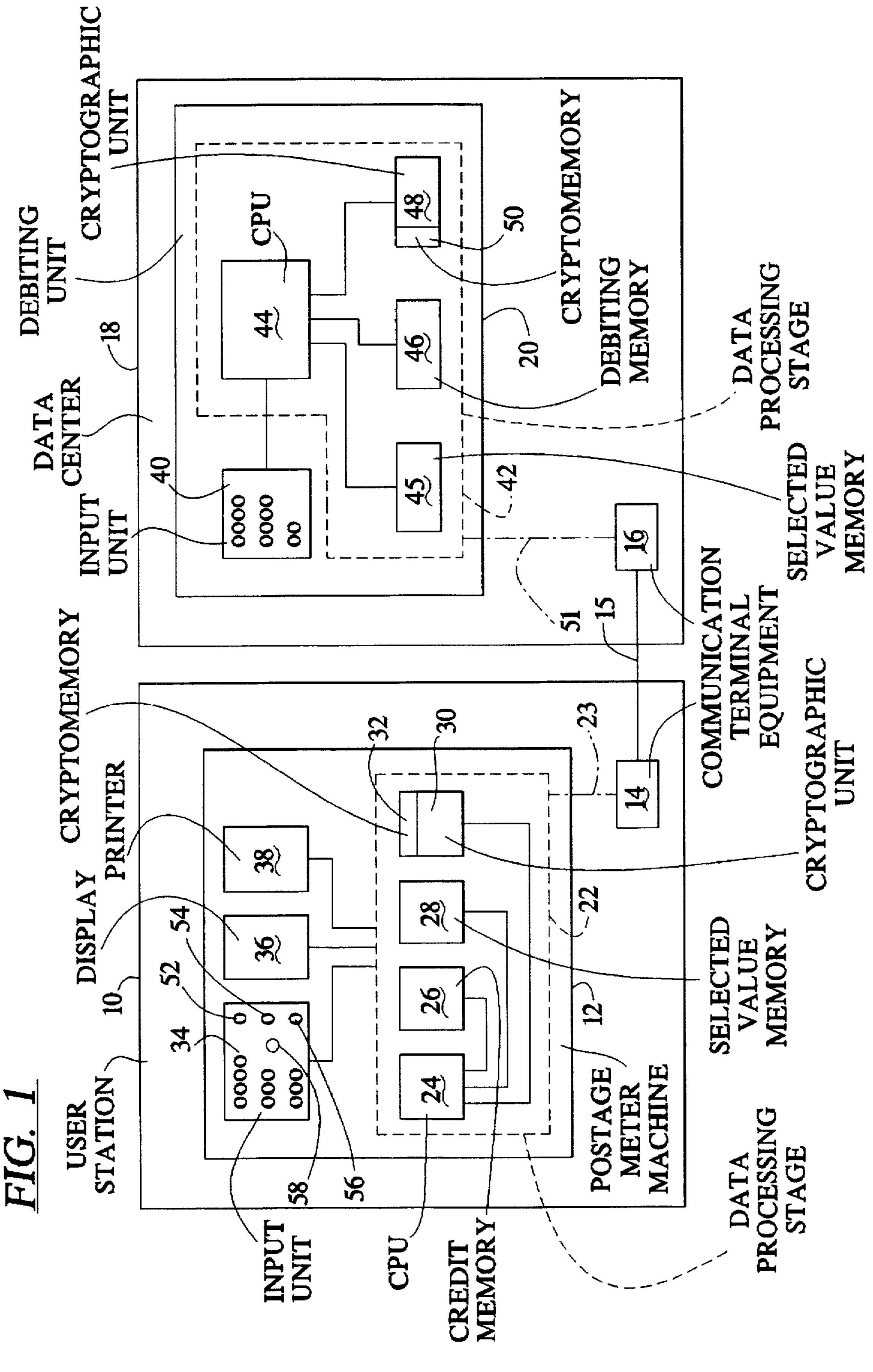
FIG. 1 is a schematic illustration of a postage meter machine and of a data center operating according to the method of the invention.

As shown in FIG. 1, a user station 10 has a postage meter machine 12 and communication terminal equipment 14 such as, for example, a telephone or a modem, which is in communication via a telephone line 15 with a communication terminal equipment 16 (telephone or modem) in a data center 18 that also contains a debiting unit 20.

The postage meter machine 12 includes a data processing stage 22 having a CPU 24, a credit memory 26, a selected value memory 28 and a cryptographic unit 30 that contains a non-volatile cryptomemory 32. The data processing stage 22, of course, also includes further components such as memories and registers that, however, are not shown since they are not required for the description of the inventive method. Preferably, software or the program memory of the CPU 24 can be utilized in combination with the cryptomemory 32 instead of the use of a separate cryptographic unit 30 in order to implement the encryption. In the case of an automatic data exchange (modem method), the data processing stage 22 is connected via a line 23 to a modem serving as the communication terminal equipment 14. An input unit 34, for example a keyboard, a display means 36 and a printer means 38 are also connected to the data processing stage 22.

The debiting unit 20 in the data center 18 includes an input unit 40 as well as a data processing stage 42 having a CPU 44, a selected value memory 45, a debiting memory 46 and a cryptographic unit 48 with a non-volatile cryptomemory 50. Again, the encryption can ensue in conjunction with the CPU 44 and the non-volatile cryptomemory 50 with software instead of using a separate cryptographic unit 48. For the modem method, the data processing unit 42 is connected via a line 51 to a modem serving as the communication terminal equipment 16.

In the voice method, the data exchange between the user station 10 and the data center 18 ensues via telephones respectively serving as the communication terminal equipment 14 and 16, preferably by telephone exchange between the user of the postage meter machine 12 and an operator in the data center 18. The important events involved with the execution of the remote value setting method in the postage meter machine and in the data center shall now be set forth with reference to FIGS. 2*a* and 2*b* that show the events in the user station or postage meter machine FM at the left and the events in the data center DZ at the right.

The value modification and remote value setting method shown in FIG. 2 begins with an identity number PIN being entered at S1 into the input unit 34 of the postage meter machine 12, this being confirmed by a special key 52 (FIG. 1). The selected value stored in the selected value memory 28 appears in the display. When this value is to be modified, the program of the data processing stage 22 branches to the routine S2 corresponding to the transaction "value change". Subsequently, the desired selected value is entered into the data processing stage 22 with the input unit 34 and is confirmed by actuation of the special key 52.

The user now calls (S4) the operator in the data center 18 and informs the operation of the identity number PIN (S5). The operator enters the identity number into the input unit 40 of the debiting unit 20 in order to identify the caller and the postage meter machine 12 of the user station 10. A check of the identity number occurs at S6. When the check is negative, the procedure is aborted and may possibly be repeated. When, by contrast, the postage meter machine 12 can be identified, step S5 is continued. The setting request of the user as well as-potentially--further information about the postage meter machine, particularly values in the debiting registers, are thereby communicated to the operator.

For continuing the procedure in the postage meter machine 12, a first code number is calculated (S7) from the identity number, the setting request and auxiliary information, for example a further register value. The first code number is calculated with a key K1, this code number being displayed on the display 36 of the postage meter machine 12 and being communicated by the user to the operator in the data center 18. At step S8, this code number is checked in the data center 18 using the key K1 stored at the data center 18. Given a negative check result, the check is repeated with the key employed in the preceding transaction. If the verification now succeeds, this means that the preceding transaction was not implemented or was not completely and correctly implemented in the postage meter machine 12. The preceding transaction is therefore canceled and the procedure is continued. If the code number cannot be verified with the preceding key, the procedure is aborted. If, by contrast, the first code number can be successfully verified, the selected value is stored in the memory 45 of the data center and the data processing stage 42 in the data center 18 calculates a second code number from the identity number, the auxiliary information and the key K1. Further, a second key K2 is calculated (S9). This second code number, wherein the new key K2 is integrated, is communicated to the user who enters it via the input unit 34 of the postage meter machine 12. The cryptographic unit 30 in the postage meter machine 12 verifies the second code number, extracts the key K2 from the communicated, second code number and stores it in place of the key K1. Given a negative result, the procedure is aborted; given a positive result, the setting request that has been entered is stored in the selected value memory 28, whereby the earlier selected value is erased (S11).

The first transaction has thus been ended and the selected value has been modified. The user now has the possibility of ending the procedure and resetting the postage meter machine 12 into the franking mode by actuating a further special key 54 (FIG. 1) or of initiating (S12) the reloading event by another actuation of the first special key 52. If the latter occurs, a third code number is calculated in the postage meter machine 12 using of the identity number and the auxiliary information, the third code number being calculated with the stored key K2. The third code number is verified (S14) in the data center. Given a negative result, the procedure is aborted; given a positive result, the data center calculates (S15) a fourth code number from the identity number, the auxiliary information and the key K2, this further code number being communicated to the postage meter machine 12 together with a new key K3. As in the first transaction, the fourth code number is verified (S16) in the postage meter machine 12 and the new key K3 is extracted from the fourth code number and stored, as ensued in the first transaction with the key K2. The old and the new keys are respectively stored in the data center. The procedure is aborted given a negative result. Given a positive result, the value stored in the selected value memory 28 of the postage meter machine is added (S17) to the remaining credit in the credit memory 26 of the postage meter machine and the value stored in the selected value memory 45 of the debiting means 20 is used to debit the remaining credit in the debiting memory 46 of the data center 18. The second transaction, i.e., the remote value scheduling with modified selected value, has thus been terminated. The postage meter machine 12 automatically returns to the franking mode.

Figure 2A:
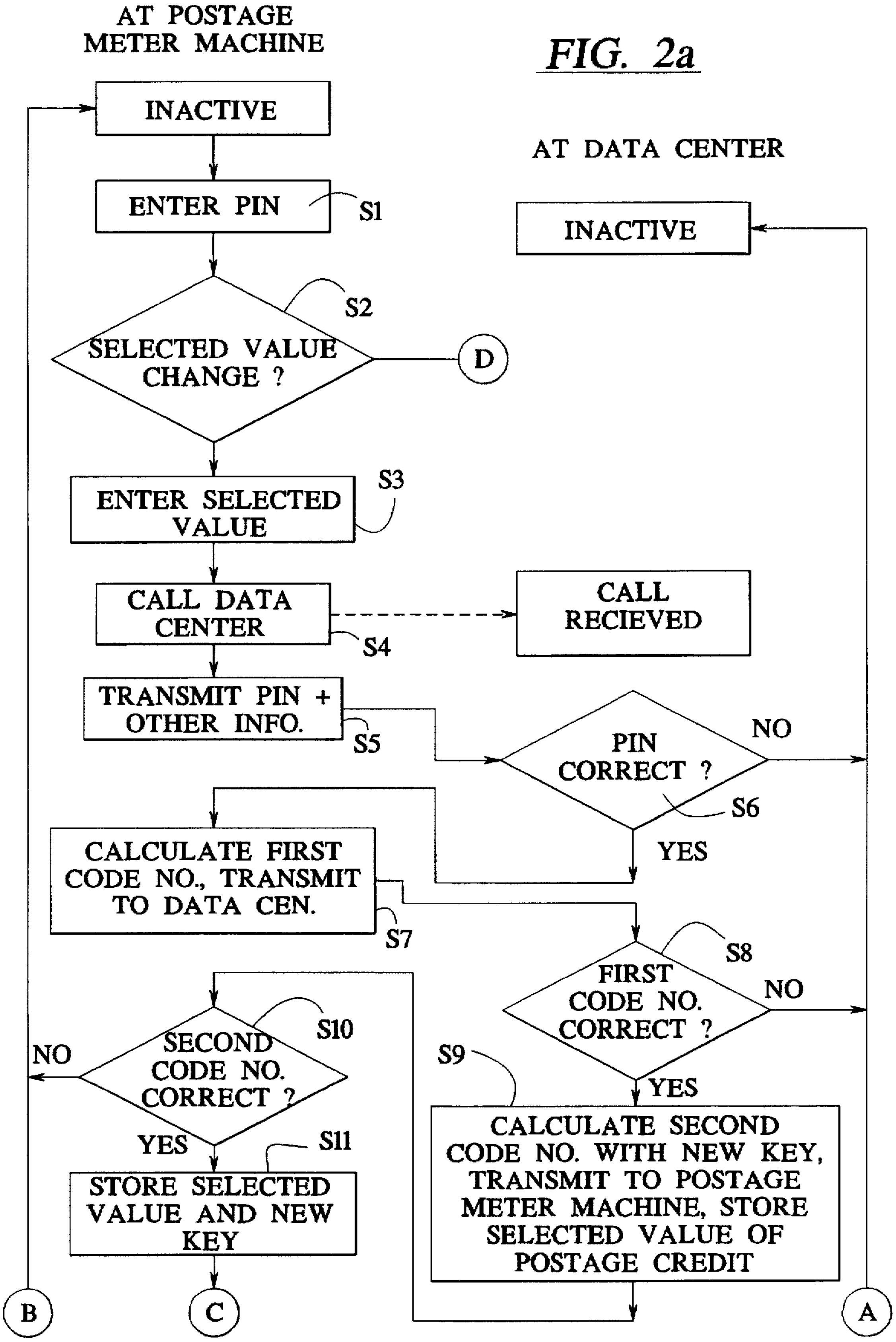
FIGS. 2*a* and 2*b* in combination constitute a flowchart illustrating the remote value scheduling method of the invention with modification of a scheduled value for the voice method.
Figure 2B:
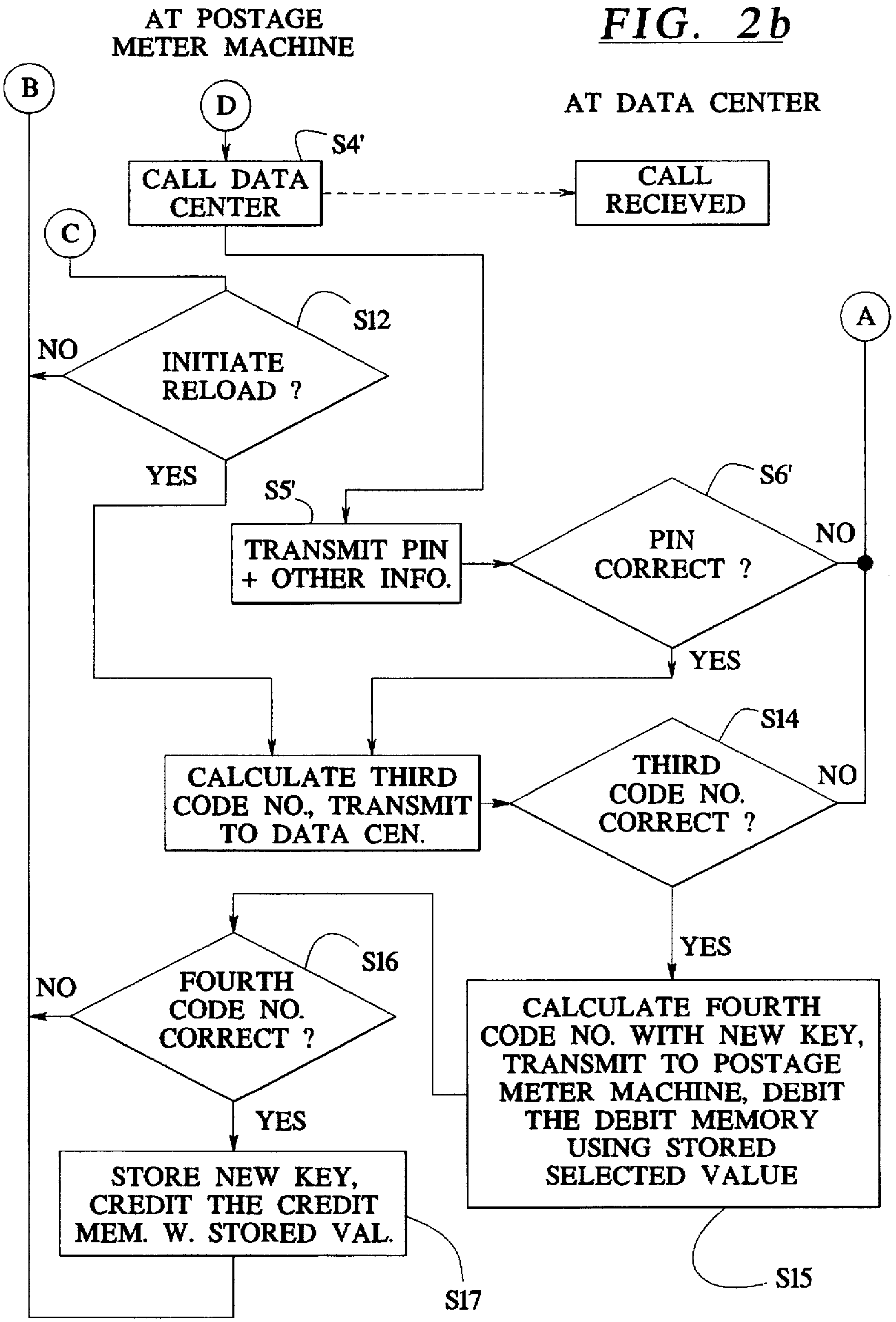

When a modification of the selected value is not desired, the selected value stored in the selected value memory 28 is confirmed by actuation of the special key 52 or by actuation of a third special key that is optionally provided and the procedure proceeds from step S2 directly to step S4' in FIG. 2*b*. The user calls the data center 18 and informs the operator of the identity number PIN and, potentially, of further information (S5'). When the identity number is correct (S6'), the remote value scheduling method then sequences according to the above description from step S13–S17.

It is evident that the operator can interrogate further data about the postage meter machine 12, particularly further register readings, in order to check the correctness of all debiting data in the postage meter machine 12 and the data center 18. It is also possible to involve further information and further sub-keys into the calculation of the code number if this is meaningful for enhancing the security. When a code number communicated from the postage meter machine 12 is checked in the data center in step S14 and the result is negative, the check is always repeated again with the key employed in the postage meter machine 12 in the immediately preceding transaction. This covers the occurrence of a transaction that was not correctly terminated in the postage meter machine without the data center 18 having received knowledge of this. In this case, the new key communicated from the data center 18 would not be stored in the postage meter machine 12 and the postage meter machine 12 therefore encrypts using the old key. This provides the possibility of annulling or correcting the last transaction and thus avoiding harm to the user or to the data center 18.

Figure 3A:
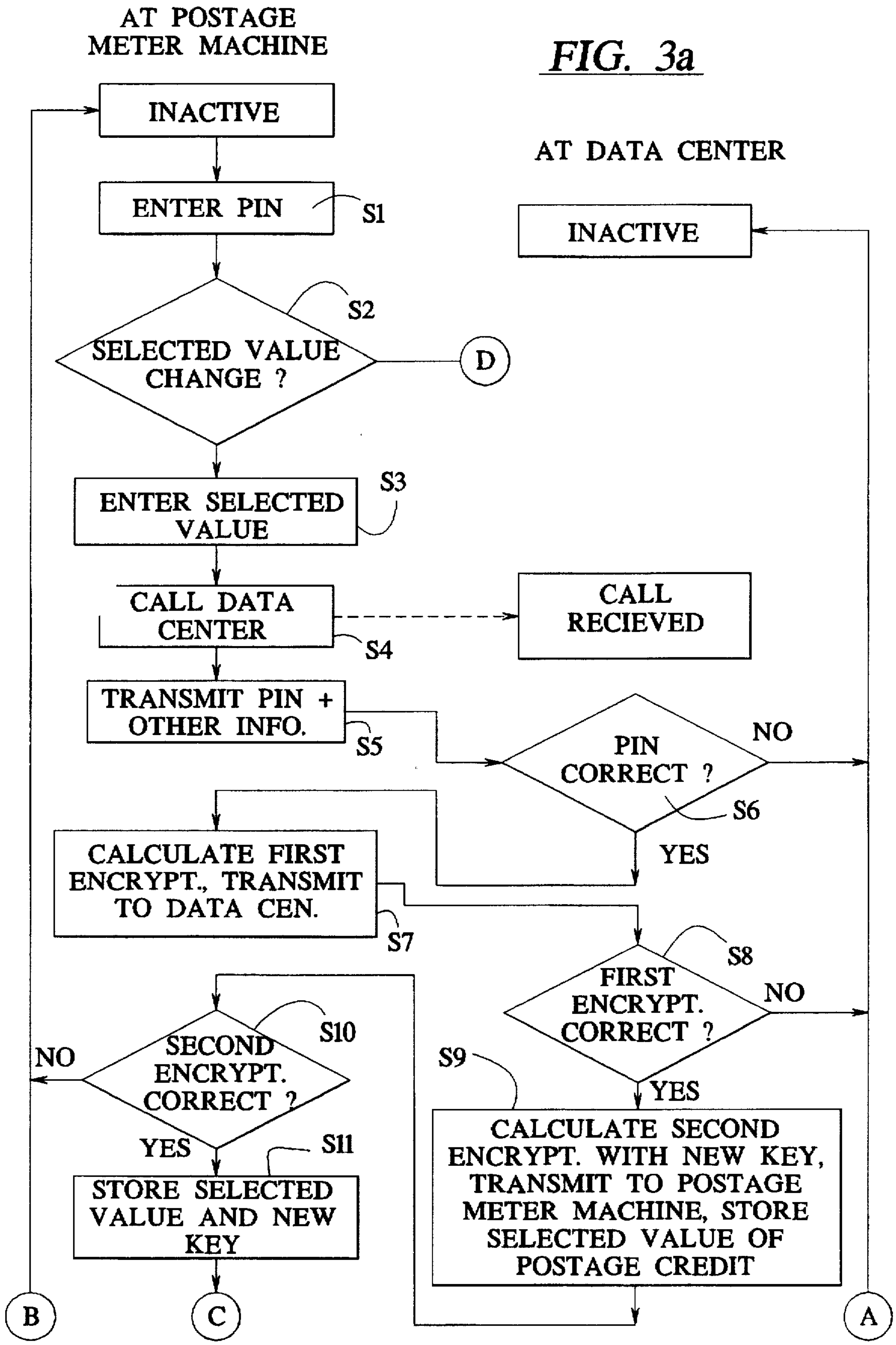
FIGS. 3*a* and 3*b* in combination constitute a flowchart illustrating the remote value scheduling method of the invention with modification of a scheduled value for the modem method.
Figure 3B:
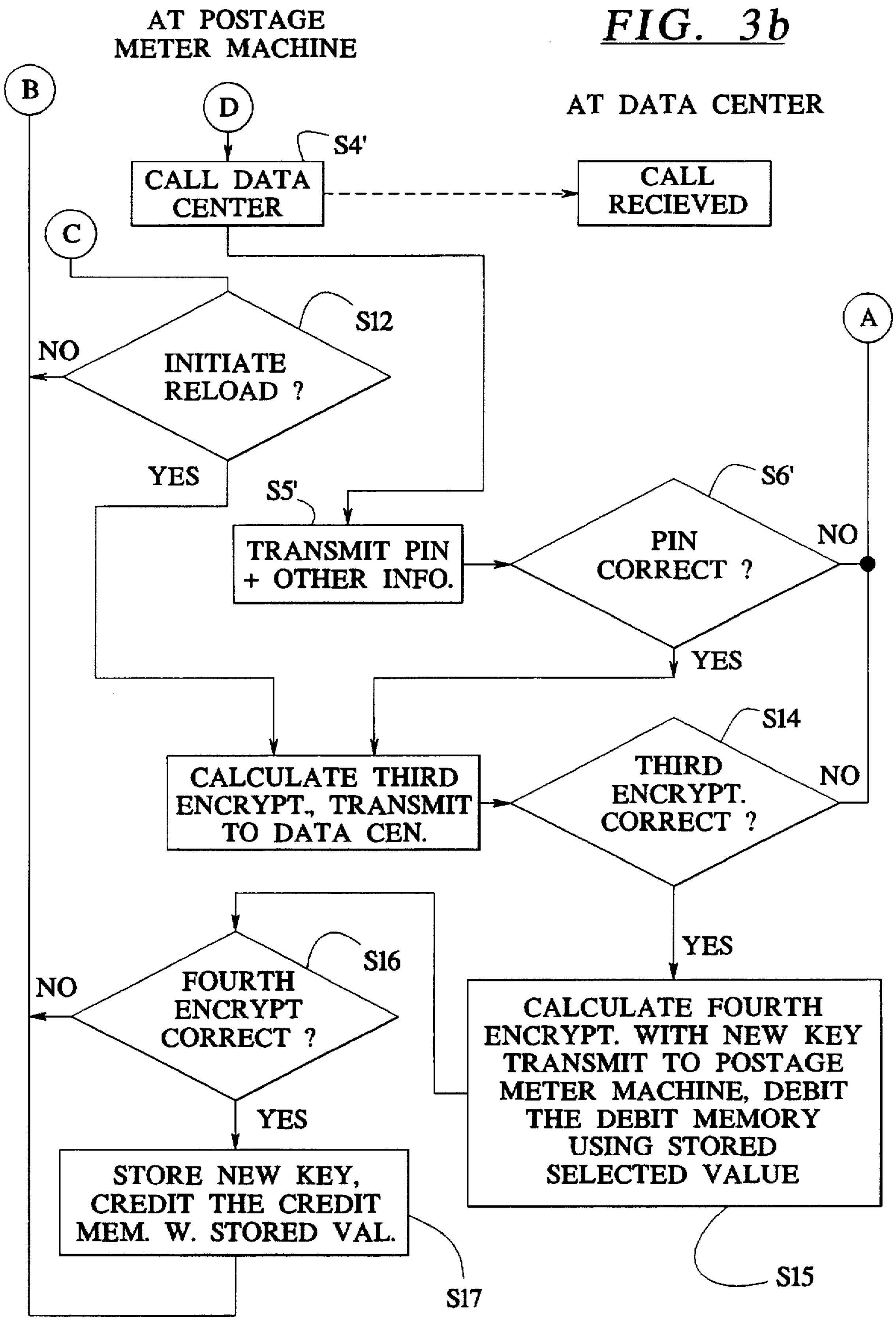

The flowchart according to FIGS. 3*a* and 3*b* shows the method for changing value and reloading in that case wherein the communication between the postage meter machine 12 and the data center 18 ensues automatically via modem. Since the steps of the method are essentially the same as in the method according to FIGS. 2*a* and 2*b*, the individual steps are provided with the same reference numerals incremented by twenty.

As in the method set forth with reference to FIGS. 2*a* and 2*b*, the user of the postage meter machine 12—after turning the machine 12 on—enters the postage telephone number or identity number PIN and confirms this entry by actuating the special key 52. The stored selected value is now displayed. The user either confirms this value by actuation of the special key 52 or overwrites it with a new selected value that is likewise confirmed by the actuation of the special key 52. All further steps now sequence automatically without further input from the user of the postage meter machine 12, between the postage meter machine 12 and the data center 18 in the same way as was set forth in the voice method described with reference to FIGS. *2a* and *2b*. The sole difference is that only the cryptomessages, i.e. the encrypted messages, and not the abbreviated code numbers acquired therefrom are exchanged between the postage meter machine 12 and the data center 18 in the modem method.

A method for storing security-related data, particularly during the remote value setting, shall now be set forth with reference to FIGS. 4–7.

Figure 4:
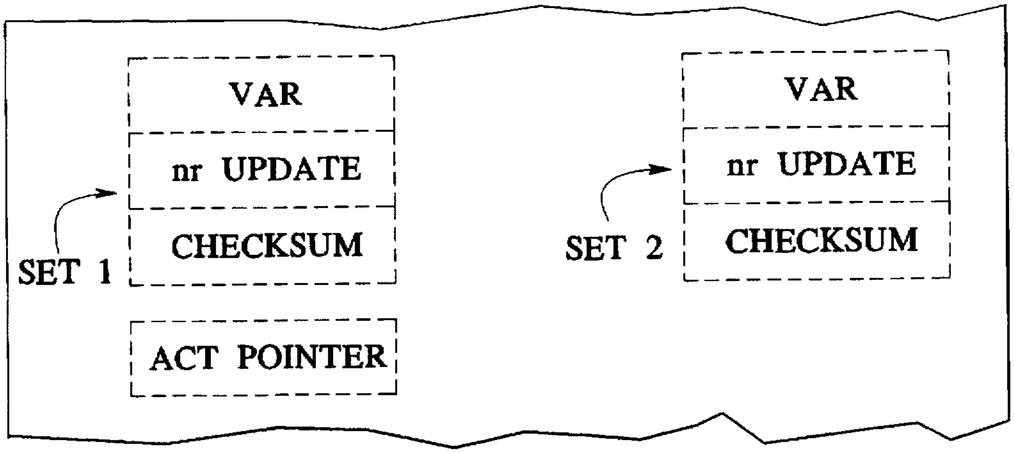
FIG. 4 illustrates the division of a memory for the protected storage of data in the form of two data sets in accordance with the method of the invention.

FIG. 4 schematically shows the division of the memory location into a non-volatile memory, for example, a NVRAM, that is present in the postage meter machine 12 and, potentially, in the data center 18 as well. The memory must have space for storing two data sets, namely set one and set two, as well as for storing a pointer. Each data set includes a variable set "var" that can be composed of an arbitrary number of bytes. Further, each data set includes a counter variable "nr update" which indicates the number of modifications of the data set, i.e., it is incremented by one upon each modification or renewal of the data of a set. Finally, a checksum is also associated with a data set, this being calculated using at least one part of the variable data of the data set.

The pointer "act pointer" can have only two permissible values that indicate which of the two data sets is considered the current data set at the moment. The values 0 and 1 are thereby not stored since no bit errors can be recognized given these values. Instead, the respective values 0×A5 or 0×5A are employed, whereby 0×indicates that the values have hexadecimal notation. Bit errors can be recognized from the number itself given this number symmetrically constructed in binary presentation.

The overall method is subdivided into three steps:

1. Initialization of the memory for the memory procedure;
2. Storing variables in ongoing operation; and
3. Checking the variables for consistency and, potentially, correction thereof.

Figure 5:
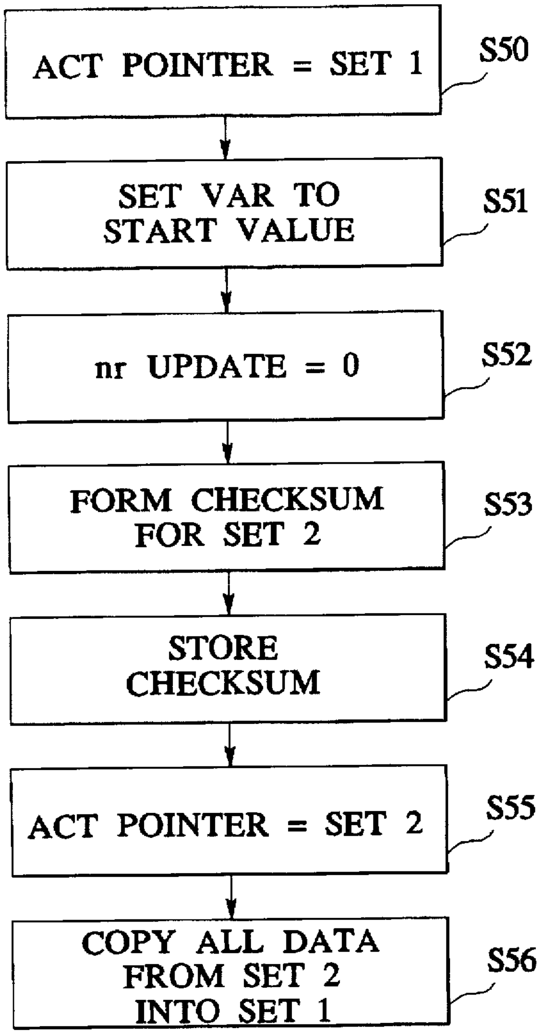
FIG. 5 is a flowchart for explaining the initialization of the data in the two data sets in accordance with the method of the invention.
Figure 6:
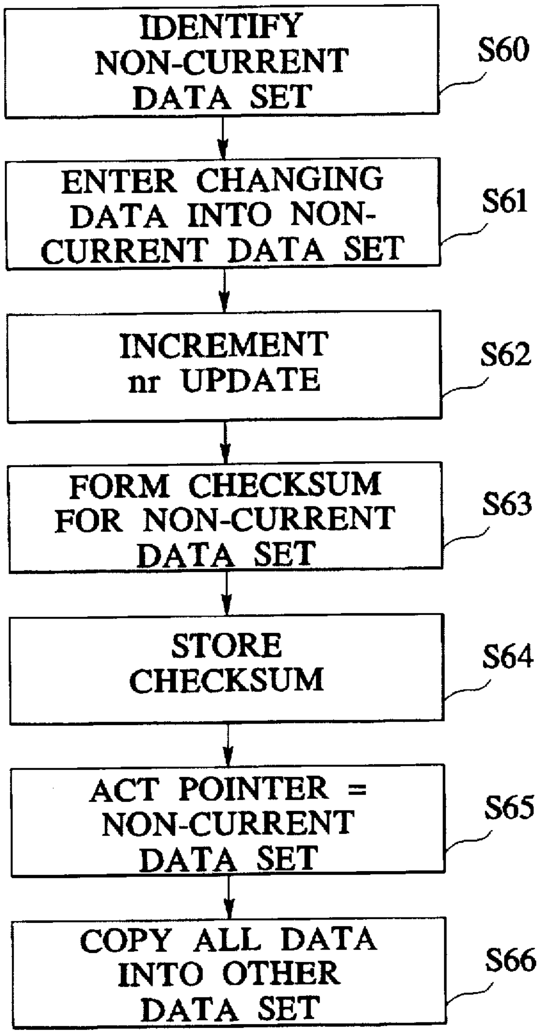
FIG. 6 is a flowchart for explaining the storage of data in ongoing operations in accordance with the method of the invention.

According to FIG. 5, the initialization of the memory includes the following steps:

First, the pointer is set to set I (step S50). This means that the set 1 is considered current, whose data are invariable. In step S51, the variables of the data set 2 are then set to their initial values. The numerical value "nr update" in data set 2 has the value 0 (S52). Subsequently, the checksum is generated using at least a part of the variable values of the data set 2 and is stored at the location of the data set 2 provided for this purpose (S53, S54). The pointer is now set to the second data set, i.e., the second data set is defined as the current data set (S55) whose data can now be accessed as reliable and invariable data. In conclusion, the entire content of data set 2 is copied into data set 1 in step S56, so that the two data sets contain identical data.

A modification of data during ongoing operations only ensues in the non-current data set. According to FIG. 6, a determination is first made during ongoing operations as to which data set is the non-current data set (S60). In step S61, changing data are also written into the non-current data set. Since the data of the data set have changed in step S61, the numerical value "nr update" is incremented by one in step S62. Subsequently, the checksum is formed again (S63) from data of the non-current memory and is stored in the non-current data set (S64). The pointer is now directed to the data set in which the data were just modified, so that this set is now the current data set (S65). In conclusion, all of the data of what is now the current data set are copied (S66) into the other, non-current data set. The two data sets again contain identical data.

A check must be carried out before turning the postage meter machine 12 on and before beginning the remote value setting to see whether a preceding transaction had been interrupted, for example due to a power outage, and operations are therefore required in order to eliminate inconsistencies in the stored data.

The following, basic conditions are established for the check:

1. The pointer "act pointer" must have an allowable value. As was already set forth above, only two values are allowed, whereby values are selected in which bit errors can be recognized from the value itself.
2. The current set referenced by the pointer must have a valid checksum.

When at least one of the conditions cited above is not satisfied, then there is a fatal error and the postage meter machine 12 switches into the service mode.

Figure 7:
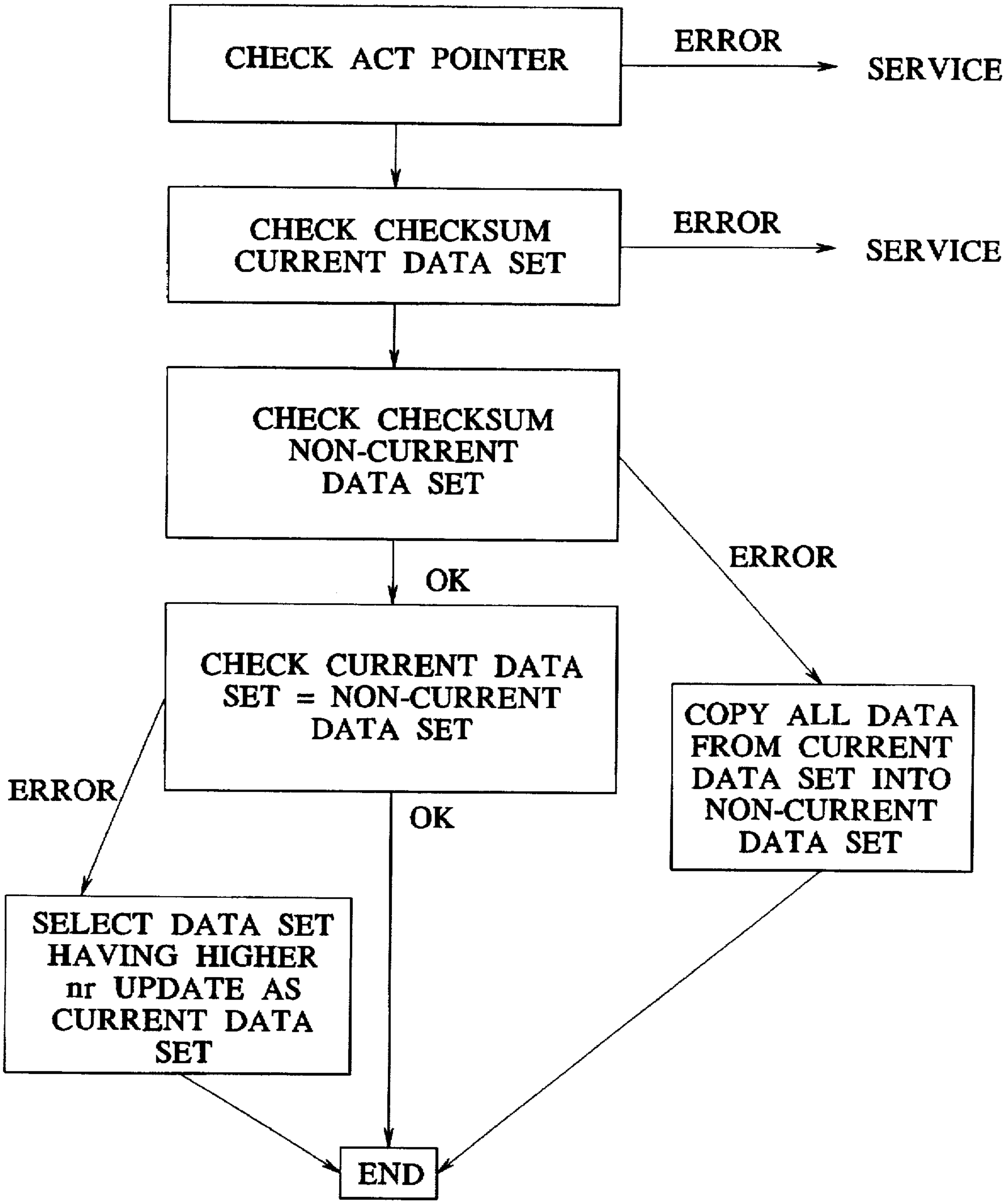
FIG. 7 is a flowchart for explaining the check and correction of data in the two data sets in accordance with the method of the invention.

The following steps are implemented for the consistency check, these to be set forth with reference to FIG. 7.

First, a check is made in step S70 to determine whether the value of the pointer is allowable. A check is made in step S71 to determine whether the checksum of the data set referred to as current by the pointer is valid. If one of these two steps is not satisfied, then the postage meter machine 12 switches into the service mode, as mentioned above.

If, by contrast, the checks in steps S70 and S71 both have a positive result, the validity of the checksum of the non-current memory is checked in step S72. If this check has a negative outcome, i.e. the checksum is not valid, it must be assumed that the data storage or the data mirroring were interrupted. The mirroring is repeated for correcting this error, i.e. all data of the current data set are copied into the non-current data set (S73). If, by contrast, the checksum has proven valid, a check is made in S74 to see whether the checksum of the two data sets, and thus their data as well, are identical. When this is the case, the check is ended. If, by contrast, the two checksums are in fact valid but not identical, this means the data protection procedure was interrupted before the mirroring. In this case, the data set whose numerical "nr update" is higher than the numerical value of the other is selected as the current set. Its data are copied into the other data set (S75).

In a modified embodiment, the postage meter machine can be configured both for the voice method and for the modem method. The user can select the type of communication procedure with the data center with a selection key 58 (FIG. 1) at the postage meter machine 12.

Although modifications and changes may be suggested by those skilled in the art, it is the intention of the inventor to embody within the patent warranted hereon all changes and modifications as reasonably and properly come within the scope of his contribution to the art.

I claim as my invention:

1. A method for matching a database in an electronic postage meter machine to a database in a data center remote from said postage meter machine and with which said postage meter machine can communicate via a communication link, said postage meter machine having a credit memory for storing postage credit which is available for franking purposes and said data center having a debit memory from which postage credit for a user of said postage meter machine is debited, said method comprising the steps of:

entering an identification number uniquely associated with said postage meter machine into said postage meter machine;

placing said postage meter machine into a first operating mode;

establishing communication via said communication link between said postage meter machine and said data center;

conducting a first transaction between said postage meter machine and said data center including forming a first code number in said postage meter machine using a first key operating at least on said identification number and said selected amount of said credit request and forming a second code number at said data center using a second key operating at least on said identification number, exchanging said first and second code numbers between said postage meter machine and said data center and verifying the first and second code numbers respectively at said data center and at said postage meter machine, and upon verification of said first and second code numbers respectively at said data center and at said postage meter machine, storing a selected amount of a credit request in each of a first selected amount memory at said postage meter machine and a second selected amount memory at said data center;

placing said postage meter machine into a second operating mode; and conducting a second transaction between said postage meter machine and said data center including exchanging further respective code numbers between said postage meter machine and said data center and, upon verification of said further respective code numbers at each of said postage meter machine and said data center, debiting said debit memory at said data center by said selected amount and crediting said credit memory at said postage meter machine by said selected amount.

2. A method as claimed in claim 1 wherein the steps of exchanging said code words and exchanging said further code words respectively comprise exchanging said code words by voice via a telephone connection as said communication link and exchanging said further code words by voice via a telephone connection as said communication link.

3. A method as claimed in claim 1 wherein the steps of exchanging said code words and exchanging said further code words comprise exchanging said code words in an encrypted transmission between a first modem at said postage meter machine and a second modem at said data center and exchanging said further code words in an encrypted transmission between said first modem and said second modem.

4. A method as claimed in claim 1 wherein the step of conducting said first transaction between said postage meter machine and said data center comprises:

communicating said selected value of said credit request together with said first code number to said data center;

verifying said first code number at said data center;

upon verification of said first code number at said data center, storing said selected amount of said credit request in said first selected value memory at said data center;

transmitting said second code number to said postage meter machine;

verifying said second code number at said postage meter machine; and upon verification of said second code number, storing said selected amount of said credit request in said second selected value memory at said postage meter machine.

5. A method as claimed in claim 4 wherein the step of conducting said second transaction between said postage meter machine and said data center comprises:

forming a third code number at said postage meter machine using said second key operating at least on said identification number;

communicating said third code number to said data center;

verifying said third code number at said data center;

upon verification of said third code number, debiting said debit memory at said data center by said selected amount of said credit request stored in said first selected value memory;

forming a fourth code number at said data center using a third key operating at least on said identification number;

communicating said fourth code number from said data center to said postage meter machine;

verifying said fourth code number at said postage meter machine; and upon verification of said fourth code number, crediting said credit memory at said postage meter machine by said selected amount of said credit request stored in said second selected value memory at said postage meter machine.

6. A method as claimed in claim 5 wherein said first key comprises the third key from an immediately preceding second transaction, and wherein said immediately preceding second transaction includes the step of communicating said third key from said data center to said postage meter machine together with said fourth code number.

7. A method as claimed in claim 6 comprising the additional steps of:

storing said third key at said data center; and if the verification of said first code word at said data center is unsuccessful, conducting a further verification of said first code word at said data center using said third key stored at said data center; and if said further verification is successful, correcting said first code number using said third key stored at said data center.

8. A method as claimed in claim 1 wherein the step of conducting said first transaction between said postage meter machine and said data center comprises:

forming said first code number in said postage meter machine using said first key operating on said identification number and said selected amount of said credit request and auxiliary information; and communicating said selected value of said credit request together with said first code number and said auxiliary information to said data center;

verifying said first code number at said data center;

upon verification of said first code number at said data center, storing said selected amount of said credit request in said first selected value memory at said data center;

forming a second code number at said data center using said second key operating on said identification number and said auxiliary information;

transmitting said second code number to said postage meter machine;

verifying said second code number at said postage meter machine; and upon verification of said second code number, storing said selected amount of said credit request in said second selected value memory at said postage meter machine.

9. A method as claimed in claim 8 wherein the step of conducting said second transaction between said postage meter machine and said data center comprises:

forming a third code number at said postage meter machine using said second key operating on said identification number and said auxiliary information;

communicating said third code number to said data center;

verifying said third code number at said data center;

upon verification of said third code number, debiting said debit memory at said data center by said selected amount of said credit request stored in said first selected value memory;

forming a fourth code number at said data center using a third key operating on said identification number and said auxiliary information;

communicating said fourth code number from said data center to said postage meter machine;

verifying said fourth code number at said postage meter machine; and upon verification of said fourth code number, crediting said credit memory at said postage meter machine by said selected amount of said credit request stored in said second selected value memory at said postage meter machine.

10. A method as claimed in claim 9 wherein said first key comprises the third key from an immediately preceding second transaction, and wherein said immediately preceding second transaction includes the step of communicating said third key from said data center to said postage meter machine together with said fourth code number.

11. A method as claimed in claim 10 comprising the additional steps of:

storing said third key at said data center; and if the verification of said first code word at said data center is unsuccessful, conducting a further verification of said first code word at said data center using said third key stored at said data center; and if said further verification is successful, correcting said first code number using said third key stored at said data center.

12. A method as claimed in claim 1 comprising the additional step of changing each of said first and second keys upon a termination of each transaction.

13. A method as claimed in claim 1 wherein said postage meter machine, said data center and said communication link provide an option of exchanging said code numbers and said further code numbers by voice or by modem, and comprising the additional step of selecting, at said postage meter machine, exchange of said code numbers by voice or exchange of said code numbers by modem.

14. An electronic postage meter machine comprising electronic data processing means having a credit memory for storing a postage credit and a selected value memory for storing a scheduled value by which the postage credit can be modified, printer means, connected to the data processing means for printing postage values, a data display input means for entering postage values to be printed, means for setting a credit reloading mode for, after entry and verification of a reloading cryptonumber, adding said selected value stored in the selected value memory to the postage credit, and means for setting a change of value mode independently of said credit reloading mode for, after entry and verification of a change of value cryptonumber, replacing the selected value in the selected value memory by a modified scheduled value entered into the postage meter machine via said input means.

15. A postage meter machine as claimed in claim 14 wherein said data processing means comprises a cryptographic means for generating and verifying said reloading cryptonumber and said change of value cryptonumber.

16. A postage meter machine as claimed in claim 15 wherein said cryptographic means comprises a memory for at least one key for use in generating said reloading cryptonumber and said change of value cryptonumber.

17. A postage meter machine as claimed in claim 14 wherein said input unit comprises a keyboard having a plurality of keys, and wherein said means for setting a change of value mode comprises means responsive to entry of an identification number via said keyboard and actuation of a first special function key of said keyboard.

18. A postage meter machine as claimed in claim 17 wherein said means for setting a credit reloading mode comprises means responsive to a second actuation of said first special function key after setting of said change of value mode.

19. A postage meter machine as claimed in claim 17 further comprising means for switching said postage meter machine to a franking mode for printing postal matter using said printing means by actuation of a second special function key of said keyboard.

20. A postage meter machine as claimed in claim 19 wherein said means for setting a credit reloading mode comprises means responsive to actuation of a third special function key of said keyboard after setting said change of value mode.

21. A postage meter machine as claimed in claim 14 for use with a data setter to which said postage meter machine is connected via a communication link, and said postage meter machine further comprising means for selecting a communication method for communication between said postage meter machine and said data center via said communication link.

22. A data center comprising communication means for data exchange with at least one user station that has at least one postage meter machine, data processing means having a data input unit, a calculating unit and a debiting memory for each postage meter machine in which credit amounts loaded in the postage meter machine are summed over a predetermined time span, a selected value memory for each postage meter machine for storing a selected value allocated to the postage meter machine by which the credit value stored in the postage meter machine is to be modified, said data processing means including means for modifying a selected value in the selected value memory allocated to a postage meter machine in response to first data received from the user station having that postage meter machine via the communication means and thereby generating a modified value, and for using the modified value stored in the selected value memory to debit the debiting memory in that postage meter machine in response to second data, independent of said first data, received from the user station having that postage meter machine via the communication means.

23. A data center as claimed in claim 22, wherein the communication means comprises a modem connectable to a modem of the user station.

24. A data center as claimed in claim 22, wherein the communication means comprises a telephone connectable to a telephone of the user station.

25. A data center as claimed in claim 22 further comprising cryptographic means for generating and verifying cryptonumbers in communicating with said user station.

26. A data center as claimed in claim 25 wherein the cryptographic means includes means for generating and storing keys for use in generating said cryptonumbers.

* * * * *